United States Patent [19]

Carlo

[11] Patent Number: 4,884,386

[45] Date of Patent: Dec. 5, 1989

[54] SYSTEM FOR RECOVERING, SELECTING AND RECYCLING REJECTED PLASTIC CONTAINERS

[75] Inventor: Gulmini Carlo, Casumaro, Italy

[73] Assignee: Govoni, SpA, Ferrara, Italy

[21] Appl. No.: 275,001

[22] Filed: Nov. 22, 1988

[51] Int. Cl.⁴ ............... B65B 63/02; B65B 63/08; B65B 13/20

[52] U.S. Cl. ............... 53/438; 53/440; 53/529; 53/127; 100/93 RP; 100/173; 100/176; 264/345; 241/99; 241/100; 241/67

[58] Field of Search ............... 53/438, 440, 127, 529, 53/530; 100/93 RP, 173, 176; 264/320, 345; 241/99, 100, 67

[56] References Cited

U.S. PATENT DOCUMENTS

| | | | |
|---|---|---|---|
| 3,687,062 | 8/1972 | Frank | 241/99 X |
| 3,756,520 | 9/1973 | Hughes | 241/99 |
| 4,059,050 | 11/1977 | Davis, Jr. | 100/173 X |
| 4,153,206 | 5/1979 | Haefner et al. | 241/99 X |
| 4,285,426 | 8/1981 | Cahill | 241/99 X |
| 4,324,325 | 4/1982 | DeWoolfson | 100/173 X |
| 4,358,995 | 11/1982 | Ballo et al. | 241/99 X |
| 4,373,435 | 2/1983 | Grevich | 241/99 X |
| 4,428,724 | 1/1984 | Levy | 264/345 X |
| 4,445,430 | 5/1984 | Pyne et al. | 100/173 X |

*Primary Examiner*—Horace M. Culver

*Attorney, Agent, or Firm*—McAulay Fisher Nissen & Goldberg

[57] ABSTRACT

A system for recovering, selecting and recycling empty containers returned after use which includes two specific sequences. In the first sequence, a container (4) passes a door (2) to remove material of a different type, while the accepted product activates a microswitch (9) for counting and activating a warming device to blow in hot air onto the same material which is thus softened; the container is then pushed between a motor driven heated pressing roll (18) with tension supplied by sliding contacts (22) to carry out a compact and permanent pressing by using pressing-welding points and another inertia roller (19). Knives (24) cooperate with the two rollers to ensure the separation. In the second sequence or selection phase, recovered bodies (29), are applied from hopper (30) and fall onto a feeding system with vibrating canals, to maintain the containers individually; photocells (34) check that no superpositions occur. X-ray source (36) is then used to send rays which are partially absorbed by the recovered bodies (29); this allows a sensor (37) to determine the typology of the same body; a microprocessor (38) then carries out the elaboration of the signal and determines the direction into which the recovered body (29) is to be sent and discharged by means of two belts (40,41).

12 Claims, 2 Drawing Sheets

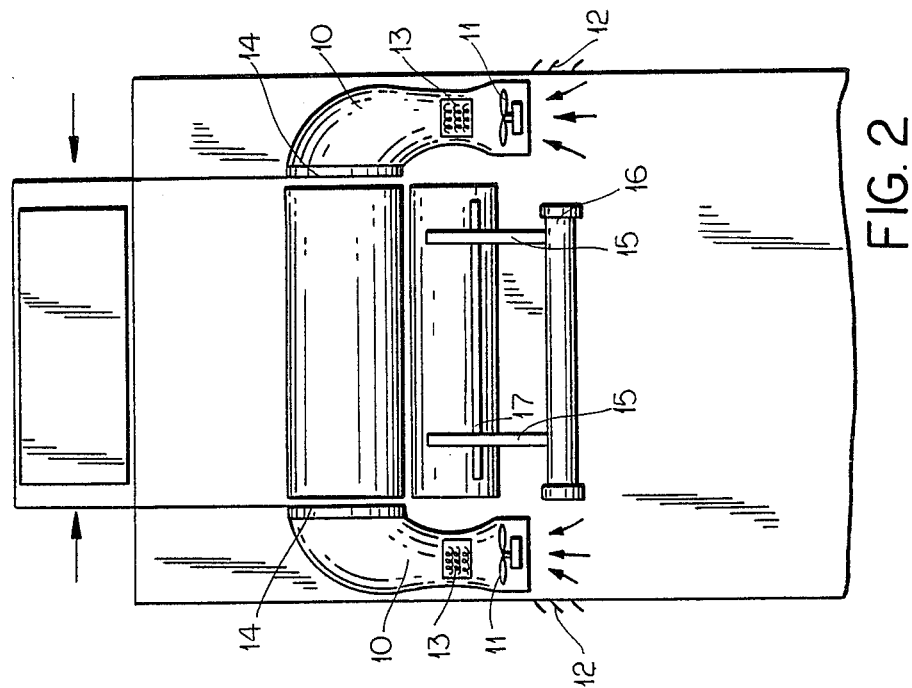
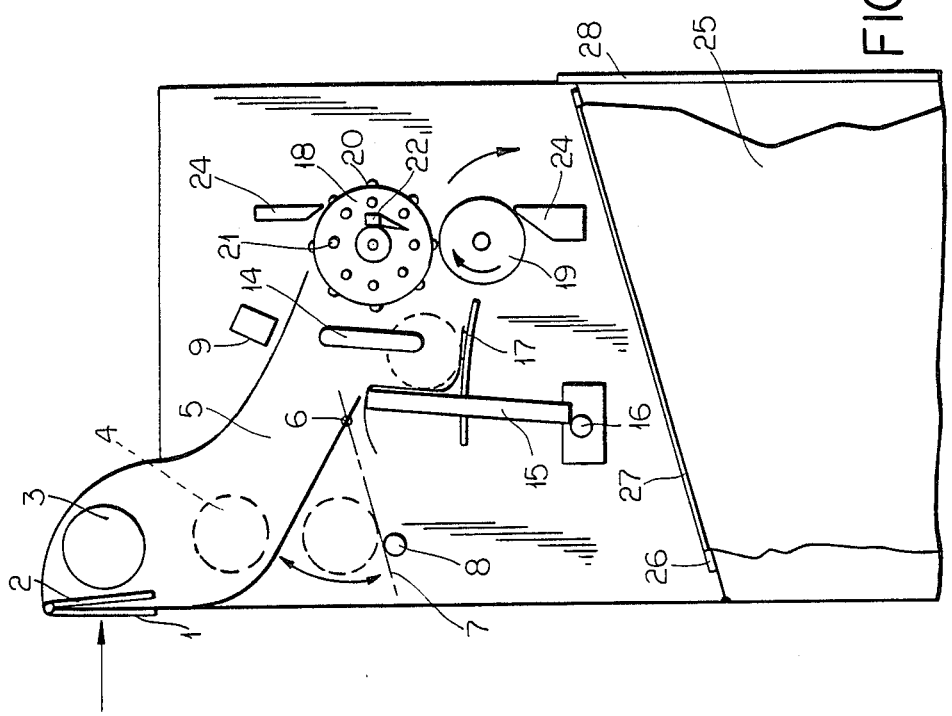

//  4,884,386

SYSTEM FOR RECOVERING, SELECTING AND RECYCLING REJECTED PLASTIC CONTAINERS

BACKGROUND OF THE INVENTION

Field of the Invention

The invention is concerned with a system for recovering, selecting and recycling rejected plastic containers.

More particularly, the invention is concerned with a complete operation cycle for recycling empty containers, brought back by users to distribution points of the products, by stowing the recovered containers which have been singularly compacted and arranged in advance, duly selected according to their materials, in packages to be sent to a recovery area or a recovering. A feeder is provided which calculates and provides a printout on a detachable label, or the number of the containers that have been introduced into the unit. The unit calculates the number of container bodies that have been introduced thereinto which form the recovered compacted bodies and, by using a recovery unitary value, ordered in advance, which has been given to them, reckons calculates the total amount due for the lot of the introduced containers. This recovery value can be used in different ways to act as an incentive for the return of the waste containers either form the user's or the distributor's side.

Cross Reference to Related Applications

This invention is related to U.S. Patent Application Ser. No. 221,137, filed July 19, 1988, Inventor-Carlo Gulmini and entitled: Apparatus and Method for Reclaiming and Recycling Plastic Material Containers for Disposal.

Description of the Prior Art

At present, the considerable encumbrance or size caused by these containers causes unsustainable stowing and transport costs which can prevent and does not allow their recovering. Consequently, these containers prior to compacting considerably increase rubbish volume and turn out to be a factor in polluting burners, particularly as a result of the dioxine which is developed when burning these containers.

One fundamental solution of the problem has been carried out and protected by means of an Italian Patent Application Ser. No. 3570A/87 which corresponds to U.S. Patent Application Ser. No. 221,137, filed July 19, 1988, in the name of Carlo Gulmini, the inventor of the subject matter of this application, which substantially foresees the transformation, by means of squeezing and press-soldering, of the rejected plastic material containers into compacted recovery bodies. In comparison with the above-identified U.S. Patent Application Ser. No. 221,137 and its related Italian Patent Application Ser. No. 3570A/87, the inventive system carries out certain improvements.

SUMMARY OF THE INVENTION

This invention is an improvement over the earlier afore-identified application by providing for a selection system for selecting the containers according to their weight which provides for the ejection of those containers not conforming to those preselected such as those made of glass or metal; a warming device is provided which works on the containers in the pre-squeezing position, to soften the containers thus in order to increase the compacting of the containers and, therefore, the density of the recovery object and to reduce it to a minimum encumbrance; a selection system for plastic typology for the recovered object; and at last a device for sending the selected ones to a sacking ready for the direct re-use.

The new system provides for two operation phases. A first operation phase is one which brings those recovered unselected containers and places them into special bags, whereas the second phase carries out the selection of these parts, thus preparing them in advance for reuse. The rationality for reuse of the containers provided for by the present system is due to the fact that the structural transformation of the container in plastic material carried out by the first operation sequence, brings to a recovered body having an encumbering volume tending to the one of the original material, which condition makes accessible the stocking and transport costs for the re-employ.

To these ends, there is provided a system according to the invention for recovering, selecting and recycling rejected or used plastic containers, comprises a first operational sequence for squeezing the container including a unit having an input device consisting of a lid provided with a front opening and side openings, each of the openings being provided so that a plastic container may be introduced into the unit through one of the openings and discharged into an access duct; a selection mechanism for eliminating non-plastic containers including a selecting-weighing device, a scale mechanism providing an impulse given in response to the dropping of a container through the access duct and a container duct opening for discharging non-plastic containers which have a weight exceeding a value established in advance; a folding door hinged to the container duct opening to facilitate its being thrown down into a drawing seat; a microswitch activated in response to the non-plastic container for emitting an alarm signal in response to the sinking can; another microswitch responsive to a container of an accepted material, a plastic container contacting and activating the microswitch for counting the quantity of the plastic containers and activating a heating device to soften the plastic container and for pressing; feeding ducts symmetrically fitted on the sides of a pressing assembly, the pressing assembly including fans for sucking air previously heated by a resistance assembly from grids and insufflating it from counter-fitted openings into the feeding duct on the container before pressing it; at the end of the descent in the access channel the container being pushed between pressing rollers by a singularizing-chocking device to avoid interferences between the object being pressed and the next following one; the singularizing-chocking device comprising a swinging lever driven by the motorization of the rollers through proper conveying with a swinging glyph, the swinging lever swinging around a second hinge and employing a leaning shelf bracket; the softened container passing between the pressing rollers, one of the pressing rollers being a motor-driven roller and the other of the pressing rollers being fixed, the motor-driven roller being fitted with proper press-soldering reliefs which permits compacting the recovered part, the press-welding operation being performed because the pressing roller itself is heated by means of cuirassed candle shaped resistances and tension is supplied by sliding contacts (22) being applied to the candle shaped resistances; a motor reducer for starting the motor-driven pressing roller; detaching the recovered parts with knives fitted on the periphery of the two rollers; and a bag into which the recovered parts are then discharged and extracted by means of binding pressing devices of hanging supports and taken away through a door opening.

The invention is also concerned with a method for recovering, selecting and recycling rejected or used plastic containers, and separating the plastic containers into two groups, one having certain preselected characteristics and the other not having the preselected characteristics comprising: two operational sequences, one of which is for squeezing the container in a unit having an input device for reception of plastic and non-plastic containers; firstly separating the non-plastic containers from the plastic containers to select only plastic containers the selection step for eliminating non-plastic containers includes weighing all of the containers and producing an impulse given in response to non-plastic containers and the dropping of non-plastic containers through an access duct and discharging the non-plastic containers through a container duct opening which containers have a weight exceeding a value established in advance, the non-plastic containers being heavier than the plastic containers; the discharging of the non-plastic container taking place through a folding door hinged to the duct opening for throwing the non-plastic container down into a drawing seat; providing a first microswitch activated in response to the non-plastic container for emitting an alarm signal in response to the non-plastic container; providing a second microswitch responsive to a container of an accepted material and activated by a plastic container contacting the microswitch for counting the quantity of the plastic containers and activating a heating device to soften the plastic containers and for pressing; feeding the plastic container through feeding ducts symmetrically fitted on the sides of a pressing assembly which includes fans sucking air previously heated by a resistance assembly through grids and insufflating it from counter-fitted openings into a feeding duct through which the plastic container is fed before pressing it; pushing the plastic container at the end of the descent in the access channel between pressing rollers by a singularizing-chocking device to avoid interferences between the container being pressed and the next following one; passing the softened plastic container between a motor-driven pressing roller and a fixed pressing roller, one of the pressing rollers being fitted with proper press-soldering reliefs for compacting the recovered part, performing a welding operation because the movable pressing roller is heated by means of cuirassed candle shaped resistances and supplying tension by sliding contacts applied to the candle shaped resistances; detaching the recovered parts with knives (24) fitted on the periphery of the two rollers; and taking up the recovered parts with a bag into which the recovered parts are discharged and extracted by means of binding pressing devices of hanging supports and removal through a door opening.

The recovered parts coming from pressing are also passed through a selection phase; and a feeding a hopper for the recovered parts is provided to feed the plastic containers to a pair of conveyor belts depending on the use to be made of the non-plastic container. Separate conveyor belts are provided in accordance with whether the plastic container is to be rejected or recycled.

BRIEF DESCRIPTION OF THE DRAWINGS

In the Drawings:

FIG. 1 is a partially perspective view of an operative compartment in which the recovery of the parts to be recovered are carried out in accordance with the invention;

FIG. 2 is a partial side view of the operative compartment of FIG. 1, and in particular also illustrates a warming device;

DESCRIPTION OF THE PREFERRED EMBODIMENTS

Figure 3:
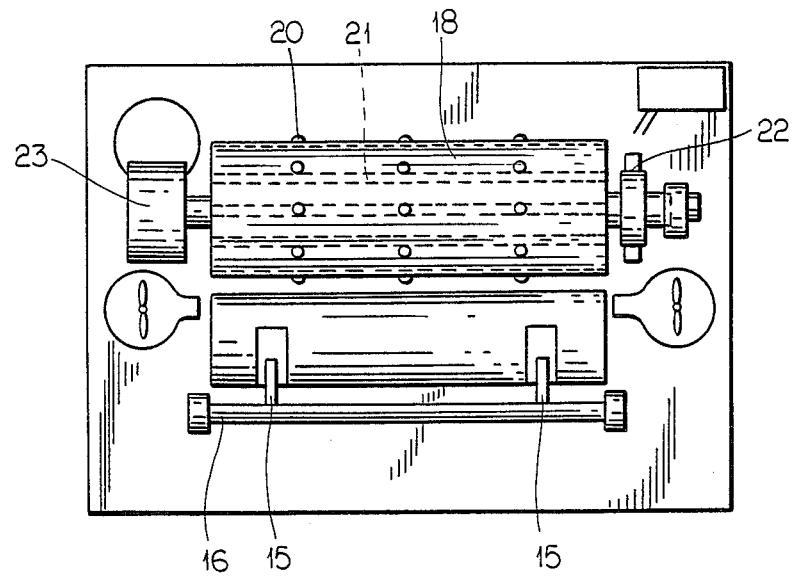
FIG. 3 is a top view of the warming device shown in FIG. 2.

Referring now more particularly to FIGS. 1 and 2 of the drawings, a first operational sequence will be explained in connection with the structure.

The first operation sequence uses a machine with a feeder consisting of an opening 1 on the front thereof with a front door 2 and side doors 3 orthogonal to the front door 2. While only one side door 3 is shown the other side also includes a side door 3 behind the one shown. A container 4 shown in dotted outline formed of plastic materials is inserted into the machine through one of the side doors 3 or front door 1. The container in plastic materials 4 is then gravitationally discharged into the access duct 5. A trap door 7 is hinged at hinge 6 to one side or a bottom side of access duct 5. Trap door 7 is provided so that other kinds of containers, such as glass containers, are eliminated therethrough. A weight selecting device forms part of trap door 7 so that trap door provides for a sensing of the weight of the container and thereby provide for a separation between plastic and non-plastic containers. When the descending container impulse exceeds a value fixed in advance, trap door 7 hinged on hinge 6 is opened during passage of the non-plastic container because of the weight thereof; passage and expulsion of the non-plastic container is thus allowed into an underlying drawing seat. For this purpose, a microswitch 8 is provided which is activated when trap door 7 is opened. As shown in FIG. 1, trap door 7 upon being opened to eject a non-plastic container contacts and activates microswitch 8. Microswitch 8 when activated emits a warning signal.

Should the container be of accepted material, such as a pre-selected type of plastic container it contacts a microswitch 9, which beside counting it, activates a heating or warming device which softens the container for pressing. Microswitch 9 is shown with a lever or leaf projecting into access duct 5 so that the plastic container when passing trap door 7 without opening it then activates microswitch 9.

Access duct 5 is juxtaposed to feeding ducts 10 on both sides of access duct 5, as best seen in FIG. 2. A heating device is contained in each of the feeding ducts 10. Fans 11, at least one in each duct 10, is provided to suck or draw air through grids 12 from the outside into ducts 10 and to pass the air over resistance assemblies 13 for heating thereof. This heating device employs the fans 11 in the feeding ducts 10 which are symmetrically fitted on the sides of the pressing assembly for sucking previously heated air by means of resistance assemblies 13 from grids 12 and insuffles or draws air through counter-posed openings 14 after passing assemblies 13 and into the feeding duct onto the container before pressing.

At the end of the containers descent in the access canal, the plastic container is pushed into a pressing zone by a flooder-singularizer, the task of which is to bring above container between a pair of rollers, one which is a pressing roller 18 and the other being an inertia roller 19, see FIG. 1, thus avoiding interferences between the roll to press and the subsequent one or inertia roll.

The pressing zone is provided with a pressing device which uses a swinging lever 15 driven by the roller motorization through proper throwing to a swinging block. This lever 15 swings around hinge 16 and employs leaning shelf or bracket 17. The softened container passes through the motor-driven pressing roll 18 and the inertia one 19. Roll 18 is fitted with proper press-soldering reliefs 20 which allow compacting with permanent trim maintaining of the recovered part. The press-soldering is performed because the roller 18 is heated by means of candle shaped armored or cuirassed resistances 21 to which tension is supplied through sliding contacts 22. The above roller 18 is driven by a special motor-reducer 23. The reclaimed parts are severed by knives 24 fitted on the periphery of the pressing and inertia rollers. The reclaimed parts are then discharged into a bag 25 which can be taken away by pressers 26 binding the hanging support 27, and can be taken away by opening lid 28.

Figure 4:
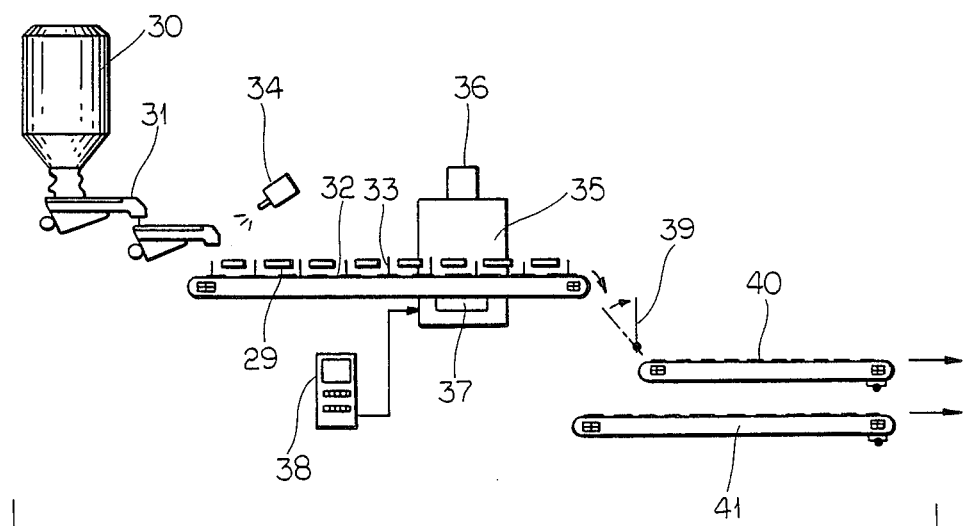
FIG. 4 is a schematic view of a selection procedure.

The second sequence of operations for selecting the containers is based on the recognition of the typology of the plastic material the container consists of and reference is made to FIGS. 3 and 4 for the structure used in connection therewith. This selection is carried out by be sprinkling or applying X-rays from a relevant source and by noticing the absorption of the X-rays by the container.

Recovered parts 29 coming from the first operational sequence are discharged from a hopper 30 onto a feeding system or feeder 31 with vibrating canals which lets or applies the recovered parts onto a singularization belt 32 with separators 33 so that there is only one recovered part between each pan of adjacent separators, while a system of photocells 34 checks that no superposition occurs and that there is only one between adjacent separators 33. The singularization belt assures that each plastic container is separated from each other. These parts then pass into a screened irradiation zone 35 where a source of X-rays 36, properly modulated, sends the rays which are partially absorbed by them. By picking the quantity of the arrived energy, a multipoint sensor 37 determines the typology of the plastic material and of what the examined recovery part consists. A microprocessor control device 38 then elaborates the signal arriving from the multipoint sensor 37 and determines the direction in which the recovered part is to be sent. The switch 39, properly positioned by the microprocessor control device 38, conveys the analyzed recovered part to discharge by means of one of the two sending belts 40 and 41. One of the belts being used to convey a plastic container which is to be recycled, and the other belt conveys the plastic containers which are rejected.

DESCRIPTION OF THE OPERATION

In the first operational sequence, container 4 passes door 2 which opens when a certain impulse value is overcome in order to exclude material of a different type, while the accepted product contacts microswitch 9. Thus microswitch 9 both counts and activates the warming device to blow in hot air from special doors or counterposed openings 14 onto the same material which is thus softened. The plastic container is then pushed by a singularizing-engulfing device by means of swinging lever 15 between motor driven pressing roller 18 which is heated by means of armored candle-shaped resistances 21, and tension is supplied by means of sliding contacts 22 to carry out a compact and permanent pressing by means of pressing-welding points 22 and inertia roller 19. The knives 24 are fitted on the periphery of the two rollers at the outlet to ensure the disjunction or separation.

In the second operational sequence, during the selection phase, recovered bodies 29, coming from the first sequence through hopper 30 fall onto the feeding system with vibrating canals, which lets them form in a singularizing band 31 with a separator 33 to insure individuality. Photocells 34 check that no superpositions occur. The recovered bodies then arrive in a screened radiation zone 35 where a properly modulated X-ray source 36 sends rays which are partially absorbed by the recovered bodies 29; this allows sensor 37, which takes the arrived quantity of energy, to determine the typology of the same body. A microprocessor fitted device 38 then carries out the elaboration of the signal arriving from multipoint sensor 37 and determines the direction into which the recovered body 29 is to be sent and discharged by one of two sending belts 40 and 41 in accordance with whether the plastic container is rejected or it is to be recycled.

While there has been shown what is considered to be the preferred embodiment of the invention, it will be obvious to those skilled in the art that various changes and modifications may be made therein without departing from the scope of the invention.

What is claimed is:

1. A system for recovering, selecting and recycling rejected or used plastic containers, comprising:
    a first operational sequence means for squeezing the container including a unit having an input device consisting of a lid (2) provided with an opening (1) and other side openings (3), each of said openings being provided so that a plastic or non-plastic container (4) is introduced into the unit (1) through one of said openings and discharged into an access duct (5);
    a selection mechanism for eliminating non-plastic containers including a selecting-weighing device, a scale mechanism providing an impulse given in response to the dropping of a container through said access duct (5) and a container duct opening for discharging non-plastic containers which have a weight exceeding a value established in advance;
    a folding door (7) hinged at hinge (6) to said duct opening, and means enabling a non-plastic container to be moved through said container duct opening for throwing down into a drawing seat;
    first microswitch means (8) activated in response to said non-plastic container for emitting an alarm signal in response to said non-plastic container;
    second microswitch means (9) responsive to a container of an accepted material, said second microswitch (9) being activated by a plastic container contacting said microswitch means (9) for counting the quantity of said plastic containers and activating a heating device to soften the plastic containers and for pressing;

feeding ducts (10), symmetrically fitted on the sides of a pressing assembly, said pressing assembly including fans (11) for sucking air previously heated by a resistance assembly (13) from grids (12) and insufflating it from counter-fitted openings (14) into the feeding duct on the container before pressing it;

at the end of the descent in the access channel (5), said plastic container (4) being pushed between pressing rollers by a singularizing-chocking device to avoid interferences between the object being pressed and the next following one;

said singularizing-chocking device comprising a swinging lever (15) driven by the motorization of the rollers through proper conveying with a swinging glyph, said lever (15) swinging around a second hinge (16) and employing a leaning shelf bracket (17);

said softened container passing between said pressing rollers, one of said pressing rollers being motor-driven roller (18) and the other of said pressing rollers (19) being a fixed inertia roller, said motor-driven roller (18) being fitted with proper press-soldering reliefs (20) which permits compacting the recovered part, said press-welding operation being performed because the roller (18) itself is heated by means of cuirassed candle shaped resistances (21) and tension supplied by sliding contacts (22) being applied to said candle shaped resistances;

a motor reducer (23) for starting said motor-driven roller (18);

knives (24) fitted on the periphery of the two rollers for detaching the recovered parts; and a bag (25) into which the recovered parts are then discharged and extracted by means of binding pressing devices (26) of hanging supports (27) and taken away through a door opening (28).

2. System for recovering, selecting and recycling rejected or used plastic containers as claimed in claim 1, wherein;

the recovered parts (29) coming from pressing pass through a selection phase; a hopper (30), from which these parts arrive and are fed onto a feeding system (31) provided with vibrating ducts which puts them on a singularizing ribbon (32) with separators (33);

a photocell system (34) for checking that no superpositions occur;

a screened irradiation zone (35) into which the parts pass, and a properly modulated X-ray source (36) sends the rays which are partially absorbed by the same parts;

a multipoint sensor (37) for determining the typology of the material of the recovered part for picking the plastic container based on the quantity of the arrived energy; and a device with a microprocessor (38) for carrying out a signal elaboration coming from the multipoint sensor (37) and determining the direction into which the recovered part is to be sent.

3. System for recovering, selecting and recycling rejected or used plastic containers as claimed in claim 2, wherein after the selection, a switch (39) properly positioned by the microprocessor (38) controls two conveying ribbons or belts (40, 41) for conveying the analyzed recovered part to a discharge by means of one of the two conveying ribbons or belts (40, 41) according to whether the plastic container is to be recycled or rejected.

4. System for recovering, selecting and recycling rejected or used plastic containers as claimed in claim 1, including:

a feeder for calculating the number of the containers inserted into the unit, on a detachable card, and which forms the recovery compact blocks; and using a unitary value established for them in advance, reckons the total amount due for the lot of containers put into the unit.

5. System for recovering, selecting and recycling rejected or used plastic containers as claimed in claim 3, including:

a feeder for calculating the number of the containers inserted into the unit, on a detachable card, and which forms the recovery compact blocks; and using a unitary value established for them in advance, reckons the total amount due for the lot of containers put into the unit.

6. System for recovering, selecting and recycling rejected or used plastic containers as claimed in claim 2, including:

a feeder for calculating the number of the containers inserted into the unit, on a detachable card, and which forms the recovery compact blocks; and using a unitary value established for them in advance, reckons the total amount due for the lot of containers put into the unit.

7. A method for recovering, selecting and recycling rejected or used plastic containers, comprising the steps of:

a first operational sequence using a unit for squeezing the container having an input device for reception of both plastic and non-plastic containers;

separating the non-plastic containers from the plastic containers for selecting only plastic containers;

said selection step for eliminating non-plastic containers including weighing the containers and producing an impulse given in response to the dropping of a non-plastic container through an access duct and discharging the non-plastic containers through a container duct opening which non-plastic containers have a weight exceeding a value established in advance;

said discharging of the non-plastic container taking place through a folding door hinged to the duct opening for throwing the non-plastic container down into a drawing seat;

providing a first microswitch activated in response to the non-plastic container for emitting an alarm signal in response to the non-plastic container;

providing a second microswitch responsive to a container of an accepted material and activated by a plastic container contacting the microswitch for counting the quantity of the plastic containers and activating a heating device to soften the plastic containers and for pressing;

feeding the plastic container through feeding ducts symmetrically fitted on the sides of a pressing assembly which includes fans sucking air previously heated by a resistance assembly through grids and insufflating it from counter-fitted openings into a feeding duct through which the plastic container is fed before pressing it;

pushing the plastic container at the end of the descent in the access channel between pressing rollers by a singularizing-chocking device to avoid interferences between the container being pressed and the next following one;

passing the softened plastic container between a motor-driven pressing roller and a fixed pressing roller, one of the pressing rollers being fitted with proper press-soldering reliefs for compacting the recovered part, performing a welding operation because the movable pressing roller is heated by means of cuirassed candle shaped resistances and supplying tension by sliding contacts applied to the candle shaped resistances;

detaching the recovered parts with knives fitted on the periphery of the two rollers; and taking up the recovered parts with a bag into which the recovered parts are discharged and extracted by means of binding pressing devices of hanging supports and removal through a door opening.

8. The method for recovering, selecting and recycling rejected or used plastic containers as claimed in claim 7, including:

passing the recovered parts coming from pressing through a selection phase;

providing for feeding a hopper with the recovered parts for feeding to a feeding system provided with vibrating ducts; and applying them onto a singularizing ribbon;

checking with a photocell system that no superpositions occur;

passing the parts through a screened irradiation zone and a properly modulated X-ray source for sending the rays which are partially absorbed by the same parts;

determining the typology of the material of the recovered part with a multipoint sensor for picking the quantity of the arrived energy; and carrying out a signal elaboration coming from the multipoint sensor and determining the direction into which the recovered part is to be sent.

9. The method for recovering, selecting and recycling rejected or used plastic containers as claimed in claim 8, including after the selection by the controlling two conveying ribbons or belts for conveying the analyzed recovered part to a discharge by means of one of the two conveying ribbons or belts according to whether the plastic container is to be recycled or rejected.

10. The method for recovering, electing and recycling rejected or used plastic containers as claimed in claim 7, including:

calculating the number of the containers inserted into the unit, and recording the same on a detachable card, and which forms the recovery compact blocks; and using a unitary value established for them in advance for calculating the total amount due for the lot of containers put into the unit.

11. The method for recovering, selecting and recycling rejected or used plastic containers as claimed in claim 8, including:

calculating the number of the containers inserted into the unit, and recording the same on a detachable card, and which forms the recovery compact blocks; and using a unitary value established for them in advance for calculating the total amount due for the lot of containers put into the unit.

12. The method for recovering, selecting and recycling rejected or used plastic containers as claimed in claim 9, including:

calculating the number of the containers inserted into the unit, and recording the same on a detachable card, and which forms the recovery compact blocks; and using a unitary value established for them in advance for calculating the total amount due for the lot of containers put into the unit.

* * * * *